(12) United States Patent
Garrec et al.

(10) Patent No.: US 11,022,677 B2
(45) Date of Patent: Jun. 1, 2021

(54) DEVICE FOR CALIBRATING AN IMAGING SYSTEM AND ASSOCIATED CALIBRATING METHOD

(71) Applicant: THALES, Courbevoie (FR)

(72) Inventors: Patrick Garrec, Merignac (FR);
Stéphane Formont, Elancourt (FR);
Richard Montigny, Pessac (FR)

(73) Assignee: THALES, Courbevoie (FR)

( * ) Notice: Subject to any disclaimer, the term of this patent is extended or adjusted under 35 U.S.C. 154(b) by 323 days.

(21) Appl. No.: 15/939,021

(22) Filed: Mar. 28, 2018

(65) Prior Publication Data

US 2018/0284222 A1    Oct. 4, 2018

(30) Foreign Application Priority Data

Mar. 29, 2017 (FR) .................................... 17 00340

(51) Int. Cl.
| | | |
|---|---|---|
| *G01S 7/40* | (2006.01) | |
| *G06T 1/00* | (2006.01) | |
| *G02B 3/08* | (2006.01) | |
| *G02B 27/64* | (2006.01) | |
| *G01S 13/931* | (2020.01) | |

(Continued)

(52) U.S. Cl.
CPC .............. *G01S 7/4004* (2013.01); *G02B 3/08* (2013.01); *G02B 27/646* (2013.01); *G06T 1/0007* (2013.01); *H01Q 1/281* (2013.01); *H01Q 1/286* (2013.01); *H01Q 5/22* (2015.01); *H01Q 21/28* (2013.01); *G01S 13/867* (2013.01); *G01S 13/931* (2013.01); *G01S 13/933* (2020.01); *G01S 13/937* (2020.01);

(Continued)

(58) Field of Classification Search
CPC .... G01S 13/867; G01S 7/4004; G01S 13/931; G01S 13/933; G01S 13/937; G01S 2013/93271; G01S 2013/9328; G01S 7/40; G01S 7/497; G02B 27/20; G02B 27/646; G02B 3/08; G06T 1/0007; H01Q 1/281; H01Q 1/286; H01Q 21/28; H01Q 5/22

See application file for complete search history.

(56) References Cited

U.S. PATENT DOCUMENTS

| | | | |
|---|---|---|---|
| 2009/0138233 A1* | 5/2009 | Kludas | G01C 15/00 702/158 |
| 2012/0050528 A1 | 3/2012 | Davies et al. | |

(Continued)

FOREIGN PATENT DOCUMENTS

| | | |
|---|---|---|
| EP | 1 217 687 A1 | 6/2002 |
| FR | 2 990 279 A1 | 11/2013 |

(Continued)

OTHER PUBLICATIONS

French Search Report, Application No. 1700340, dated Jan. 19, 2018.

*Primary Examiner* — Timothy X Pham
(74) *Attorney, Agent, or Firm* — Nixon & Vanderhye

(57) ABSTRACT

Disclosed is a calibration device of an imaging system for a moving carrier, the imaging system including: a support panel; an antenna array comprising radiating elements positioned on the support panel; and optical sensors capable of providing images and positioned on the support panel. The calibration device includes at least one optical pattern generator, each generator being secured to the support panel.

20 Claims, 2 Drawing Sheets

(51) Int. Cl.
  *G01S 13/86* (2006.01)
  *G01S 13/933* (2020.01)
  *G01S 13/937* (2020.01)
  *H01Q 1/28* (2006.01)
  *H01Q 21/28* (2006.01)
  *H01Q 5/22* (2015.01)
  *G02B 27/20* (2006.01)

(52) U.S. Cl.
  CPC ............. *G01S 2013/9328* (2013.01); *G01S 2013/93271* (2020.01); *G02B 27/20* (2013.01)

(56) References Cited

U.S. PATENT DOCUMENTS

| | | | |
|---|---|---|---|
| 2012/0120144 A1* | 5/2012 | Ramakrishnan | B41J 29/393 347/19 |
| 2014/0130570 A1* | 5/2014 | Lal | G01P 21/00 73/1.41 |
| 2014/0139671 A1* | 5/2014 | Oh | G06T 7/80 348/148 |
| 2014/0300756 A1* | 10/2014 | Murase | G09G 3/006 348/189 |
| 2015/0293228 A1* | 10/2015 | Retterath | G01S 7/4817 356/5.01 |
| 2015/0362587 A1 | 12/2015 | Rogan et al. | |
| 2016/0116573 A1* | 4/2016 | Appia | G01S 7/40 342/52 |
| 2016/0161602 A1 | 6/2016 | Prokhorov | |
| 2016/0165212 A1* | 6/2016 | Mullis | H04N 13/282 348/48 |
| 2016/0313395 A1* | 10/2016 | Unlu | G01R 31/2856 |

FOREIGN PATENT DOCUMENTS

| | | | |
|---|---|---|---|
| FR | 3 031 193 A1 | 7/2016 | |
| WO | 2014/162344 A1 | 10/2014 | |
| WO | WO-2016070318 A1 * | 5/2016 | ............... G06T 7/80 |

\* cited by examiner

DEVICE FOR CALIBRATING AN IMAGING SYSTEM AND ASSOCIATED CALIBRATING METHOD

This patent application claims the benefit of document FR 17 00340 filed on Mar. 29, 2017 which is hereby incorporated by reference.

FIELD OF THE INVENTION

The present invention relates to a device for calibrating an imaging system for a mobile carrier. The present invention also relates to an associated imaging system, mobile carrier and calibration method.

BACKGROUND OF THE INVENTION

Multi-sensor imaging is widely used in the aeronautics field, in particular for surveillance uses, for obstacle sense-and-avoid, to designate areas of interest or for automatic landing assistance.

It is thus known to equip a mobile carrier, for example an aircraft, with several capture systems, both a radiofrequency system able to perform detection and radar surveillance functions, and an optoelectronic system able to provide digital images of monitored scenes or objects. In such a case, the harmonization of the radiofrequency and optoelectronic systems is done one time only.

However, in case of vibration of the support system on which the various lenses of the optoelectronic systems are inserted, it is not possible to correct any image dynamically, except in exceptional cases where the targets of interest are distributed homogeneously and symmetrically. Only a partial correction of a location of the image is possible, without being able to compensate for any deviations in its absolute position.

SUMMARY OF THE INVENTION

There is a need for a device for calibrating an imaging system for a mobile carrier allowing dynamic corrections, in particular when the carrier is moving.

To that end, proposed is a device for calibrating an imaging system for a mobile carrier, the imaging system comprising a support panel, an antenna array comprising radiating elements arranged on the support panel, and optical sensors able to provide images and arranged on the support panel. The calibration device comprises at least one optical sighting generator, each generator being secured to the support panel.

According to specific embodiments, the calibration device comprises one or more of the following features, considered alone or according to any technically possible combination:
  each generator comprises an emitter capable of emitting optical radiation and an optical system comprising a conversion unit able to obtain an optical sighting from the optical radiation emitted by the emitter.
  the conversion unit is a prism, a hologram or a Fresnel lens.
  each generator comprises an optical fiber inserted between the emitter and the conversion unit.
  the emitter is a laser.
  the conversion unit is secured to the support panel.

The description also describes an imaging system for a mobile carrier, the imaging system comprising a support panel, an antenna array comprising radiating elements arranged on the support panel, and optical sensors able to provide images and arranged on the support panel. The imaging system is provided with a device for calibrating the imaging system, the calibration device comprising at least one optical sighting generator, each generator being secured to the support panel.

Also described is a mobile carrier, in particular an aircraft, equipped with an imaging system as previously described.

Also proposed is a method for calibrating an imaging system for a mobile carrier, the imaging system comprising a support panel, an antenna array comprising radiating elements arranged on the support panel, and optical sensors able to provide images and arranged on the support panel. The imaging system is provided with a device for calibrating the imaging system, the calibration device comprising at least one optical sighting generator, each generator being secured to the support panel. The method comprises the steps of generating an optical sighting by the calibration device, collecting images of the optical sighting by the optical sensors, and using the collected images to calibrate the optical sensors.

According to specific embodiments, the calibration method comprises one or more of the following features, considered alone or according to any technically possible combination:
  the method further comprises a step for calculating the deformation of the support panel using collected images.
  a first reference axis is defined for the antenna array and a second reference axis is defined for the optical sensors, the method further comprising a step for aligning the two reference axes.

BRIEF DESCRIPTION OF THE DRAWINGS

Other features and advantages of the invention will appear upon reading the following description of embodiments of the invention, provided as an example only and in reference to the drawings, which are.

DETAILED DESCRIPTION OF THE PREFERRED EMBODIMENTS

Figure 1:
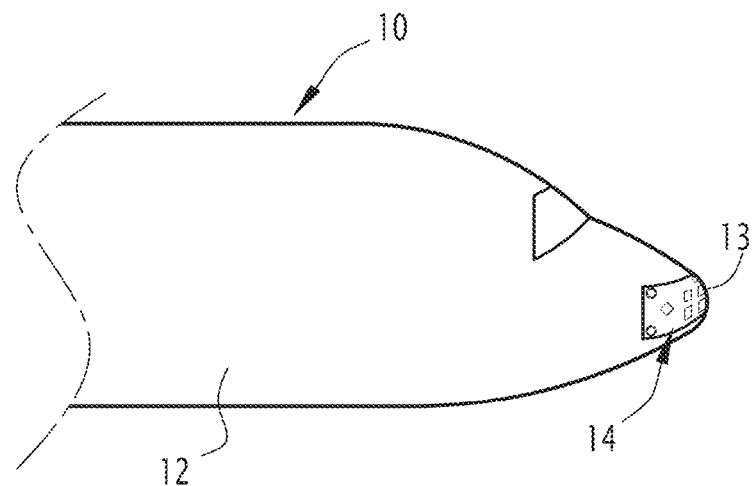
FIG. 1, a schematic view of an aircraft equipped with an imaging system,
  FIG. 2, an enlarged view of the imaging system of FIG. 1 comprising a calibration device,
  FIG. 3, a schematic view of an example of a calibration device part,
  FIG. 4, a schematic view of another example of a calibration device part,
  FIG. 5, a schematic view of still another example of a calibration device part, and
  FIG. 6, an illustration of an example optical sighting used by the calibration device of FIG. 2.

FIG. 1 shows an aircraft 10.

An aircraft 10 is a transportation means capable of rising up and moving at altitude, within the Earth's atmosphere.

An aircraft 10 is for example a helicopter or an airplane. In the illustrated case, the aircraft 10 is an airplane.

The airplane 10 comprises a side wall 12 and a front wall 13 provided with an imaging system 14.

Figure 2:
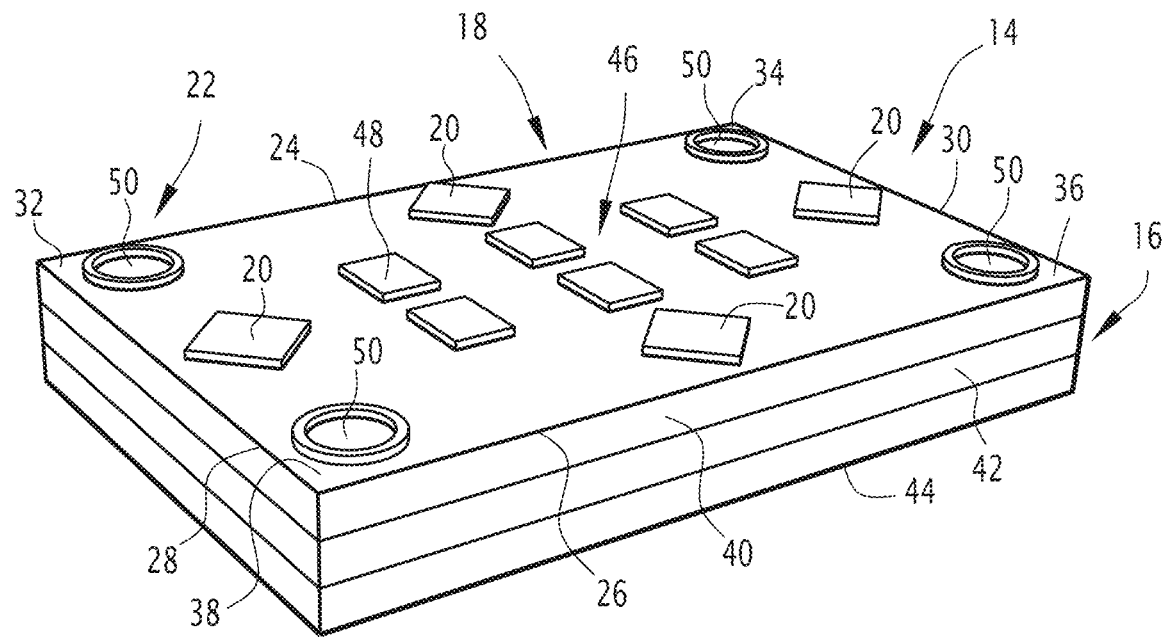

The imaging system 14 is shown more specifically in FIG. 2.

The imaging system 14 is a multi-sensor system in particular making it possible to obtain digital image data and radar data jointly. The imaging system 14 comprises a support panel 16, an antenna 18, optical sensors 20 and a calibration device 22 for calibrating the imaging system 14.

The support panel 16 has a rectangular shape.

This means that the support panel 16 comprises first parallel edges 24 and 26 and second parallel edges 28 and 30, the edges 24, 26, 28 and 30 being arranged to form a rectangle.

Furthermore, four corners 32, 34, 36 and 38 are defined for the support panel 16.

The support panel 16 comprises a radiation surface 40, a spacing layer 42 and a ground plan 44.

The radiation surface 40, the spacing layer 42 and the ground plan 44 have the same shape as the support panel 16.

The spacing layer 42 is inserted between the radiation surface 40 and the ground plan 44.

The radiation surface 40 is for example made from epoxy resin.

The spacing layer 42 is made from a dielectric material.

The ground plan 44 is made from a conductive material.

The antenna 18 is a planar antenna, able to operate in transmission and reception in a given frequency band.

For example, the frequency band is the X band, i.e., a frequency band comprised between 8 GigaHertz (GHz) and 12 GHz.

Furthermore, a first reference axis is defined for the antenna 18.

The first reference axis is a wireless axis, the wireless axis for example corresponding to the main transmission and/or reception direction of the antenna 18.

In the example of FIG. 2, the antenna 18 is an antenna array 46.

The antenna array 46 comprises radiating elements 48.

The radiating elements 48 are sometimes called "radiofrequency sensors" or patches.

The radiating elements 48 are positioned on the support panel.

According to the illustrated example, each radiating element 48 is arranged in a regular periodic pattern.

In the illustrated example, the number of radiating elements 48 is six and has only a small portion of the radiating surface 40.

Figure 3:
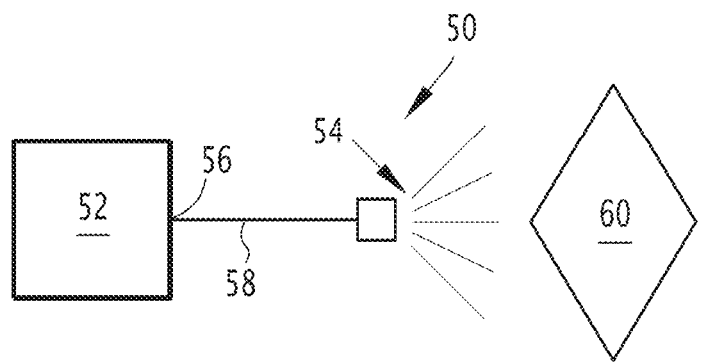

Each radiating element 48 is shown schematically in FIG. 3 in the form of a square.

Other geometric shapes can be considered, such as a circle or a more complex shape.

The antenna array 46 is able to interact with a processing circuit making it possible to process the signals captured by the antenna array 46.

The assembly of the antenna array 46 and the processing circuit forms a radar.

The optical sensors 20 are capable of detecting optical rays.

It is possible to define a second reference axis, called optical axis, for all of the optical sensors 20, the optical axis corresponding to the main sighting direction of the optical sensors 20.

Each optical sensor 20 is shown in the form of a diamond in FIG. 2.

Four optical sensors 20 are visible in FIG. 2.

In the described example, the optical sensors 20 are photographic sensors.

According to the proposed case, the optical sensors 20 are charge-coupled devices. Such devices are often designated using the acronym CCD.

Alternatively, the optical sensors 20 are CMOS (Complementary Metal Oxide Semiconductor) sensors.

Each optical sensor 20 is able to detect at least one optical ray having a wavelength comprised in a range of wavelengths.

According to the described example, the range of wavelengths comprises only wavelengths corresponding to the visible domain.

Alternatively, the optical sensors 20 are capable of operating in the infrared domain.

According to another example, the optical sensors 20 are of several types, some optical sensors 20 being capable of operating in the visible domain and other optical sensors 20 being capable of operating in the infrared domain.

The optical sensors 20 are positioned on the support panel 16.

More specifically, the optical sensors 20 are positioned on at least one of the edges 24, 26, 28 and 30 of the support panel 16.

Each optical sensor 20 is positioned at the middle of a respective edge 24, 26, 28 and 30.

More generally, the optical sensors 20 are positioned on the support panel 16 so as not to disrupt the radiation diagram of the antenna array 46.

Each optical sensor 20 is capable of interacting with an image processing circuit making it possible to process the images captured by each optical sensor 20 in order to obtain an image, and in particular a digital image of about 10 megapixels.

The assembly of an optical sensor 20 and the image processing circuit forms an imager.

The support panel 16 comprising a plurality of sensors 20 and 48, the support plane 16 is sometimes described as "multi-sensor support panel".

The calibration device 22 is in particular able to allow the calibration of the optical sensors 20.

The calibration device 22 is, in this sense, an "optical calibration device".

The calibration device 22 comprises at least one optical sighting generator 50 also named optical pattern generator 50, the two terms being equivalent.

According to one particular case, the number of generators 50 is greater than or equal to 1.

Alternatively, the number of generators 50 is less than 4.

In the illustrated example, the calibration device 22 comprises four optical sighting generators 50.

In other embodiments, the calibration device 22 comprises fewer than four optical sighting generators 50.

Each generator 50 is shown in the form of a ring.

Furthermore, as shown in FIG. 2, each generator 50 is located in a corner 32, 34, 36 and 38 of the support panel 16.

Each generator 50 is secured to the support panel 16.

"Secured" means that at least part of the generator 50 is part of the support panel 16 so that the optical sighting generated by the generator 50 follows the movement of the support panel 16.

Figure 4:
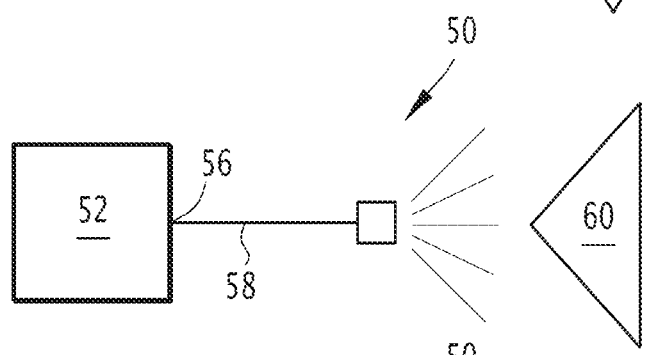
Figure 5:
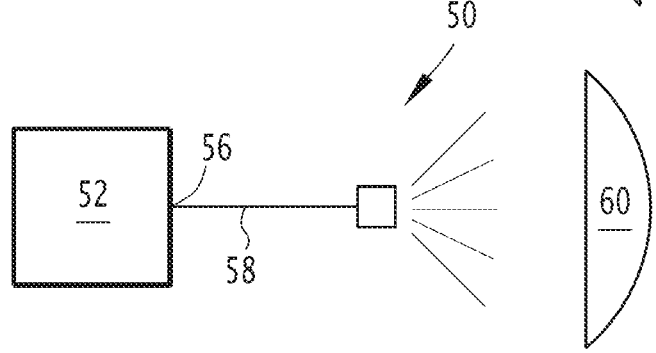

Examples of generators 50 are shown in FIGS. 3 to 5.

It is assumed that each generator 50 of FIG. 2 is according to the embodiment of FIG. 3.

Hereinafter, a generator 50 is first described according to FIG. 3, the generators according to FIGS. 4 and 5 next being described in terms of how they differ from the generator 50 of FIG. 3.

As shown in FIG. 3, each generator 50 comprises an emitter 52 and an optical system 54.

The emitter 52 is an emitter for optical rays having a wavelength comprised in the range of wavelengths of the optical sensors 20.

The emitter 52 is able to emit the optical radiation at an output 56 of the emitter 52.

In the described example, the emitter 52 is a laser.

The optical system 54 comprises a transport unit 58 and a conversion unit 60.

The transport unit 58 is a unit able to transport the optical radiation from the emitter 52 from the output 56 of the emitter 52 to the conversion unit 60.

The transport unit 58 is inserted between the emitter 52 and the conversion unit 60.

According to the example of FIG. 3, the transport unit 58 is an optical fiber.

The conversion unit 60 is able to convert the incident optical radiation into a pattern forming an optical sighting.

In other words, the conversion unit 60 is able to obtain an optical sighting from the optical radiation emitted by the emitter 52.

Figure 6:
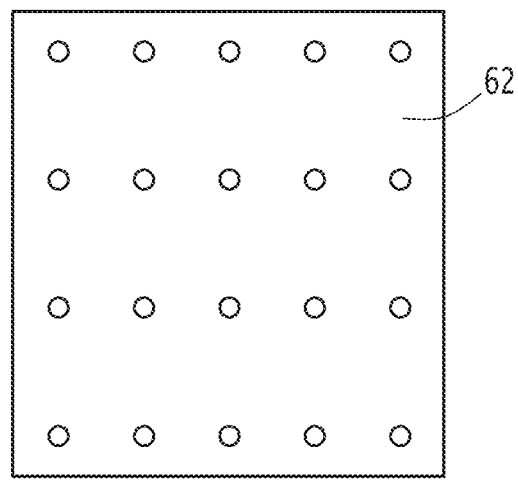

An example pattern forming an optical sighting 62 is shown in FIG. 6.

In the illustrated example, the optical sighting 62 is a set of points regularly spaced apart, forming a matrix of 5 points by 5 points.

The optical sighting 62 is a pattern comprising at least 25 distinct points.

In general, the optical pattern 62 is a pattern comprising a plurality of lines having a large enough size to be visible from each optical sensor 20.

In the example of FIG. 3, the conversion unit 60 is a diffractive optical element.

More specifically, the conversion unit 60 is a hologram.

Furthermore, the conversion unit 60 is able to diffract the incident rays according to seven distinct orders, namely orders −3, −2, −1, 0, 1, 2 and 3.

In the particular case of FIG. 3, the conversion unit 60 is secured to the support panel 16.

This makes it possible to offset the emitter 52 relative to the support panel 16.

The calibration device 22 also comprises a controller capable of controlling the generators 50 and calibrating the optical sensors 20 using a calibration method described below.

The operation of the imaging system 14 and, in particular, the calibration device 22 will now be described in reference to an example embodiment of a method for calibrating the imaging system 14.

To that end, the calibration method comprises a step for generating an optical sighting 62 via the calibration device 22.

The optical sighting 62 thus obtained is recorded by the optical sensors 20 to form images of the optical sighting 62.

The method next comprises a step for collecting images of the optical sighting 62 via the optical sensors 20. The collection is carried out at the controller of the calibration device 22.

The method then comprises a step for using collected images to calibrate the optical sensors 20, taking advantage of the fact that the displayed optical sighting 62 is the same for all of the optical sensors 20 and that the properties of the optical sighting 62 are known by the controller of the calibration device 22.

The usage step is then a calculating step carried out by the controller.

The optical sighting 62 can be projected on very different surfaces, in particular on clouds or the ground. This makes the calibration method able to be carried out even during a flight of the aircraft 10.

Furthermore, the calibration method uses a target secured to the support panel 16 shared by all of the optical sensors 20.

The method thus makes it possible to perform a dynamic calibration of the optical sensors 20 with an optical sighting 62 subject to the same vibrations and deformations as the support panel 16.

The method thus ensures a calibration of the entire image and harmonizes the errors between the antenna 18 and the optical sensors 20.

This effect is reinforced by the spatial colocalization on the same support panel 16 of all of the sensors.

Furthermore, the precision is improved, since the calibration is in fact a so-called "hyper-resolution" or "super-resolution" method making it possible to obtain resolutions smaller than the size of the pixels of the optical sensors 20. The precision is obtained using digital recalibration processing.

To that end, according to one specific embodiment, the method further comprises a step for aligning the two reference axes.

The alignment step is carried out by estimating the offset between the first reference axis (wireless axis) and the second reference axis (optical axis), then digitally correcting the estimated offset.

More specifically, the antenna 16 localizes a moving target by angle error measurement or by dual-axis monopulse measurement. The optical sensors 20 are focused at the distance and in the direction obtained by the antenna 16. The target is acquired by the imaging system 14 and the pointing errors between the optical axis and the wireless axis are calculated to next be taken into account in the correction. Through such dynamic measurements on opportunity targets, the corrections of the offset are done and adjusted during the operation of the imaging system 14.

The alignment step is in particular important for firing or guiding applications.

The calibration method can also be used for other additional applications.

For example, according to one particular case, the method further comprises a step for calculating the deformation of the support panel 16 using collected images.

According to another example, the method comprises determining the vibration experienced by the support panel 16 using collected images. To that end, it uses the fact that the expanse of the observed spot of light depends on the amplitude of the vibration.

Furthermore, the calibration method is not very restrictive relative to the calibration device 22, many alternatives of the latter being possible.

Thus, according to another embodiment illustrated by FIG. 4, the conversion unit 60 is a prism.

According to still another embodiment visible in FIG. 5, the conversion unit 60 is a Fresnel lens.

The operation of the imaging system 14 in the case of FIGS. 4 and 5 is identical to the operation described for the imaging system 14 of FIGS. 1 to 3.

The imaging systems 14 in the cases of FIGS. 4 and 5 have the same advantages as the imaging system 14 of FIGS. 1 to 3.

In each of the illustrated cases, only the conversion unit 60 is positioned in the support panel 16, which facilitates the addition of the calibration device 22 on an existing imaging system 14.

Alternatively, each generator 50 comprises an optical radiation emitter 52 capable of operating on a specific range of wavelengths.

This makes it possible to consider a method working with different colored sightings.

According to one particular embodiment, the controller of the calibration device 22 is capable of working with superimposed sightings or sightings used sequentially.

Furthermore, the method is compatible with other configurations of the sensors on the support panel 16.

According to one particular example, the optical sensors 20 are positioned on the support panel with a pseudo-random distribution.

Furthermore, the method is usable for any type of moving carrier comprising a multi-sensor imaging system, i.e., any type of vehicle.

In particular, the vehicle can be used in the aeronautic, railway, naval or other fields. The use of the vehicle is also irrelevant, whether for signaling or surveillance.

In each of the proposed cases, the calibration device 22 allows dynamic corrections at least on the optoelectronic part of an imaging system 14, in particular when the carrier is moving.

The invention claimed is:

1. A calibration device of an imaging system for a moving carrier, the imaging system comprising:
   a support panel comprising a radiation surface layer, a spacing layer, and a ground plan layer,
   an antenna array comprising radiating elements positioned on the support panel, and
   optical sensors capable of providing images and positioned on the support panel,
   the calibration device comprising at least one optical pattern generator that generates an optical pattern, each optical pattern generator being secured to the support panel.

2. The device according to claim 1, wherein each optical pattern generator comprises an emitter capable of emitting optical radiation and an optical system comprising a conversion unit able to obtain the optical pattern from the optical radiation emitted by the emitter.

3. The device according to claim 2, wherein the conversion unit is a prism, a hologram or a Fresnel lens.

4. The device according to claim 2, wherein each optical pattern generator comprises an optical fiber inserted between the emitter and the conversion unit.

5. The device according to claim 2, wherein the emitter is a laser.

6. The device according to claim 2, wherein the conversion unit is secured to the support panel.

7. The calibration device of claim 1, wherein the calibration device comprises plural of the at least one optical pattern generator.

8. The calibration device of claim 1, wherein,
   the spacing layer is located intermediate the radiation surface layer and the ground plan layer,
   the radiating elements comprise radiofrequency sensors positioned on the radiation surface layer of the support panel, and
   the optical sensors are positioned on the radiation surface layer of the support panel.

9. The calibration device of claim 8, wherein,
   the spacing layer, the radiation surface layer, and the ground plan layer have a common shape and perimeter.

10. The calibration device of claim 8, wherein,
    the radiation surface layer is an epoxy resin layer,
    the spacing layer is a dielectric material layer,
    the ground plan layer is a conductive material layer.

11. An imaging system for a moving carrier, the imaging system comprising:
    a support panel comprising a radiation surface layer, a spacing layer, and a ground plan layer,
    an antenna array comprising radiating elements positioned on the support panel, and
    optical sensors capable of providing images and positioned on the support panel,
    the imaging system being provided with a calibration device for calibrating the imaging system, the calibration device comprising at least one optical pattern generator that generates an optical pattern, each optical pattern generator being secured to the support panel.

12. A moving carrier equipped with the imaging system according to claim 11.

13. The imaging system of claim 12, wherein,
    the spacing layer, the radiation surface layer, and the ground plan layer have a common shape and perimeter,
    the radiation surface layer is an epoxy resin layer,
    the spacing layer is a dielectric material layer, and
    the ground plan layer is a conductive material layer.

14. An aircraft equipped with the imaging system according to claim 11.

15. The imaging system of claim 11, wherein the calibration device comprises plural of the at least one optical pattern generator.

16. The imaging system of claim 11, wherein,
    the spacing layer is located intermediate and in contact with the radiation surface layer and the ground plan layer,
    the radiating elements comprise radiofrequency sensors positioned on the radiation surface layer of the support panel,
    the optical sensors are positioned on the radiation surface layer of the support panel, and
    the at least one optical pattern generator that generates an optical pattern is positioned on the radiation surface layer of the support panel.

17. A method for calibrating an imaging system for a moving carrier, the imaging system comprising:
    a support panel comprising a radiation surface layer, a spacing layer, and a ground plan layer,
    an antenna array comprising radiating elements positioned on the support panel, and
    optical sensors capable of providing images and positioned on the support panel,
    the imaging system being provided with a calibration device for calibrating the imaging system, the calibration device comprising at least one optical pattern generator that generates an optical pattern, each optical pattern generator being secured to the support panel,
    the method comprising the following steps:
    generating the optical pattern via the at least one optical pattern generator of the calibration device,
    collecting images of the optical pattern via the optical sensors, and
    using collecting images to calibrate the optical sensors.

18. The method according to claim 17, further comprising a step for calculating the deformation of the support panel using collected images.

19. The method according to claim 17, wherein a first reference axis is defined for the antenna array and a second reference axis is defined for the optical sensors, the method further comprising a step for aligning the first and second reference axes.

20. The method of claim 17, wherein the calibration device comprises plural of the at least one optical pattern generator and in said generating the optical pattern step, each optical pattern generator generates a respective one of the optical pattern.

\* \* \* \* \*